US011088972B2

(12) United States Patent
Le Huerou et al.

(10) Patent No.: US 11,088,972 B2
(45) Date of Patent: Aug. 10, 2021

(54) UPDATING MESSAGES EXCHANGED WITH A CONVERSATIONAL AGENT

(71) Applicant: ORANGE, Issy-les-Moulineaux (FR)

(72) Inventors: Emmanuel Le Huerou, Chatillon (FR); Francois Toutain, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/617,950

(22) PCT Filed: May 30, 2018

(86) PCT No.: PCT/FR2018/000150
§ 371 (c)(1),
(2) Date: Nov. 27, 2019

(87) PCT Pub. No.: WO2018/220297
PCT Pub. Date: Dec. 6, 2018

(65) Prior Publication Data
US 2020/0112528 A1 Apr. 9, 2020

(30) Foreign Application Priority Data

May 31, 2017 (FR) ...................... 1754819

(51) Int. Cl.
G06F 15/16 (2006.01)
H04L 12/58 (2006.01)
H04W 4/12 (2009.01)
(52) U.S. Cl.
CPC .............. H04L 51/04 (2013.01); H04L 51/16 (2013.01); H04L 51/24 (2013.01); H04W 4/12 (2013.01)
(58) Field of Classification Search
CPC ......... H04L 51/02; H04L 51/04; H04L 51/16; H04L 51/24; H04W 4/12
(Continued)

(56) References Cited

U.S. PATENT DOCUMENTS 8,289,951 B2 * 10/2012 Moore ................ H04L 65/4007
370/352
8,856,236 B2 * 10/2014 Moore ................ H04M 7/1265
709/205
(Continued)

FOREIGN PATENT DOCUMENTS

EP 2797284 A1 10/2014
EP 2797284 B1 * 10/2018 ........... H04L 63/107
(Continued)

OTHER PUBLICATIONS

English translation of the Written Opinion of the International Searching Authority dated Aug. 27, 2018 for corresponding International Application No. PCT/FR2018/000150, filed May 20, 2018.
(Continued)

Primary Examiner — Moustafa M Meky
Assistant Examiner — Thorne E Waugh
(74) Attorney, Agent, or Firm — David D. Brush; Westman, Champlin & Koehler, P.A.

(57) ABSTRACT

A method for updating at least one message exchanged in an instant messaging conversation between a terminal and a conversational agent. The at least one message includes at least one validity indicator and a user interaction element intended to be restored by the terminal. The method includes: detecting an event relating to obsolescence of at least one of the messages of the conversation; selecting, according to a feature of the detected event, at least one obsolete message of the conversation; modifying the validity indicator in the selected messages; and restoring modified messages depending on a value of the validity indicator.

14 Claims, 4 Drawing Sheets

Figure 1A:
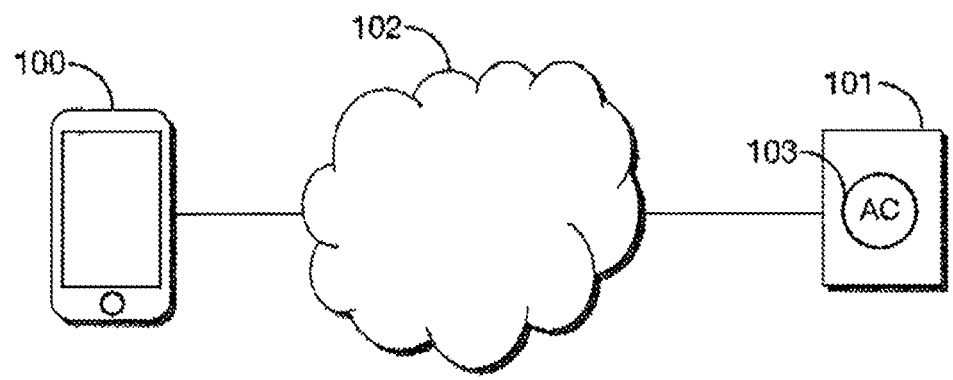

(58) Field of Classification Search
USPC .......................................................... 709/206
See application file for complete search history.

(56) References Cited

U.S. PATENT DOCUMENTS

| | | | | |
|---|---|---|---|---|
| 8,949,377 | B2* | 2/2015 | Makar | G06F 16/9535 709/219 |
| 10,218,668 | B1* | 2/2019 | Karp | H04L 51/12 |
| 2003/0088623 | A1* | 5/2003 | Kusuda | H04L 51/04 709/204 |
| 2003/0185232 | A1* | 10/2003 | Moore | H04M 15/09 370/465 |
| 2005/0268237 | A1* | 12/2005 | Crane | G06Q 10/107 715/732 |
| 2008/0104169 | A1* | 5/2008 | Combel | H04L 51/04 709/204 |
| 2011/0047228 | A1* | 2/2011 | Balasaygun | H04L 67/04 709/206 |
| 2011/0177800 | A1* | 7/2011 | Gilson | H04M 3/42382 455/417 |
| 2014/0094210 | A1* | 4/2014 | Gellens | H04W 4/90 455/517 |
| 2014/0122618 | A1* | 5/2014 | Duan | H04L 51/02 709/206 |
| 2014/0143684 | A1* | 5/2014 | Oh | H04L 51/04 715/752 |
| 2014/0279050 | A1* | 9/2014 | Makar | G06F 16/9535 705/14.66 |
| 2016/0313906 | A1* | 10/2016 | Kilchenko | G06N 3/0436 |
| 2016/0378271 | A1* | 12/2016 | Toutain | H04L 51/16 715/752 |
| 2017/0048170 | A1* | 2/2017 | Smullen | H04L 67/02 |
| 2017/0093774 | A1* | 3/2017 | Arastafar | H04L 65/1069 |
| 2017/0118150 | A1* | 4/2017 | Peng | H04L 51/046 |
| 2017/0180499 | A1* | 6/2017 | Gelfenbeyn | H04L 51/02 |
| 2017/0250930 | A1* | 8/2017 | Ben-Itzhak | G06F 3/011 |
| 2017/0279906 | A1* | 9/2017 | Laird-McConnell | H04L 67/10 |
| 2019/0199658 | A1* | 6/2019 | Kim | H04L 51/14 |

FOREIGN PATENT DOCUMENTS

WO        2014176896 A1    11/2014
WO    WO-2014176896 A1 *  11/2014 ............. H04L 51/02

OTHER PUBLICATIONS

International Search Report dated Aug. 20, 2018 for corresponding International Application No. PCT/FR2018/000150, filed May 20, 2018.
Written Opinion of the International Searching Authority dated Aug. 20, 2018 for corresponding International Application No. PCT/FR2018/000150, filed May 20, 2018.

* cited by examiner

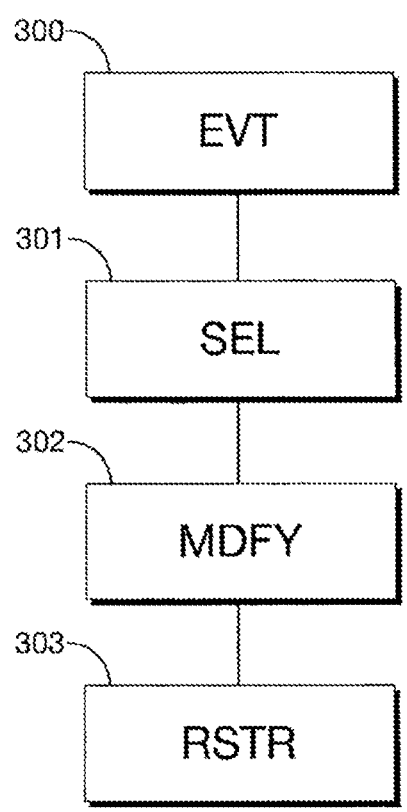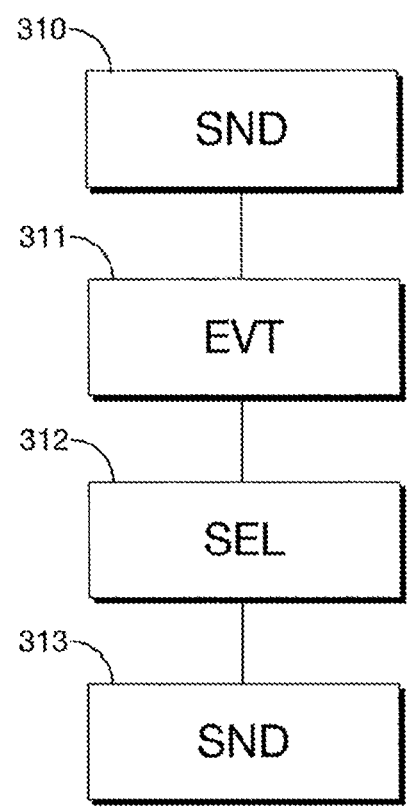
Figure 3a
Figure 3b

UPDATING MESSAGES EXCHANGED WITH A CONVERSATIONAL AGENT

CROSS-REFERENCE TO RELATED APPLICATIONS

This Application is a Section 371 National Stage Application of International Application No. PCT/FR2018/000150, filed May 20, 2018, which is incorporated by reference in its entirety and published as WO 2018/220297 A1 on Dec. 6, 2018, not in English.

TECHNICAL FIELD

The present invention relates to the field of telecommunications and pertains more particularly to a method for modifying a plurality of instant messages exchanged during a communication between a terminal and a communication device.

PRIOR ART

The public has for some years demonstrated a strong craze for communications of instant messaging type. Indeed, this mode of communication affords more interactivity than communication by email while being less intrusive than voice communication. Mass public adoption of this mode of communication and the arrival on the market of touchscreen mobile terminals has been accompanied by advances in user interfaces making it possible to facilitate this mode of communication. Thus, user interfaces are today converging toward a conversational view in which the messages sent and the messages received are presented in bubbles arranged on either side of the screen of the terminal and ordered chronologically. Barring a few exceptions, this type of presentation in conversation form is predominant on most terminals and messaging applications, all brands considered.

The content of instant messages such as these is not limited to text. They can contain a so-called "rich" content, such as for example formatted text, images or else interaction elements such as hypertext links or action buttons.

This type of communication is now so pervasive that today it is no longer reserved for exchanges between physical people. Indeed, today it is possible to exchange messages with software robots capable of interpreting messages sent by users and of responding thereto in a more or less relevant way. It is possible to cite for example robots specializing in meteorological forecasts capable of responding to questions formulated in natural language, of the type "what will the weather be tomorrow in Paris?". Thus, a user has a unified interface for communicating with other users and for accessing services. This type of robot capable of interacting with users by exchanging messages is sometimes called a "conversational agent" or "chatbot" in English.

The use of this type of communication is expanding still further today with the advent of "conversational commerce". Conversational commerce implements conversational agents adapted to allow users to place orders for goods or services by formulating natural language queries, carry out financial transactions or else make bookings. Thus, users need no longer download a dedicated application or access a Web site to place an order, and the service provider does not need to publish and to maintain an application or a Web site in order for users to be able to access its services.

Within the framework of an order made via an exchange of instant messages with a conversational agent, it is commonplace for a user to receive messages containing indications on the progress of an order. Some of these messages may contain hypertext links making it possible for example to open a Web page on the basis of which it is possible to track the delivery of a parcel, or else buttons for canceling an order or for again placing an order identical to a previous order. More generally, instant messages may contain interaction elements which allow the triggering of actions and/or access to information not adapted to viewing directly in a message.

These interaction elements in the instant messages improve user experience but present a drawback.

A characteristic of communications by instant messaging is that a history of the messages exchanged is preserved. Thus, a user can scroll back through a list of messages exchanged to re-read past exchanges and retrieve for example the reference of a particular order. Some of these stored messages may contain interaction elements that have become obsolete. For example, a hypertext link for tracking the conveying of a parcel becomes pointless once the parcel has been delivered. Nevertheless, it still appears in the history and an interaction on such a link triggers an action whose result is indeterminate if the product has been delivered to its addressee.

Thus, the users can trigger actions that have become obsolete on the basis of messages received beforehand and stored by the terminal. More generally, the content of obsolete messages can introduce confusion for the user of a terminal.

Unfortunately, the prior art is devoid of any effective solutions for guarding a user against the use of obsolete information or links contained in a history of instant messages exchanged with a conversational agent.

SUMMARY OF THE INVENTION

With the aim of alleviating this problem, a method for updating at least one message exchanged in an instant messaging conversation between a terminal and a conversational agent is proposed. The method is noteworthy in that the at least one message comprises at least one validity indicator and a user interaction element intended to be rendered by the terminal and in that it comprises the following steps:
  detection of an event relating to the obsolescence of at least one of the messages of the conversation,
  selection, according to a characteristic of the detected event, of at least one obsolete message of the conversation,
  modification of the validity indicator in the selected messages, and
  rendering of the modified messages according to a value of the validity indicator.

In a conventional manner, the instant messaging applications display the messages sent and received in conversation bubbles. Such a conversation bubble corresponds to a zone in which a particular message is displayed. The method allows the modification of the content of one or more of these conversation bubbles in such a way that a value or any other obsolete element of the message is recognized as such by the user and/or that an action cannot be triggered on the basis of these bubbles.

Thus, when an event relating to the obsolescence of at least one of the messages of the conversation is detected, the messages concerned are updated so as to guard a user of the terminal on which the method is implemented against actions whose result would be indeterminate.

The inventive concept resides in the fact of marking with the aid of a validity indicator messages or parts of messages, such as for example interaction elements included in messages. Such an indicator makes it possible to indicate that the validity of the element with which the indicator is associated is temporary. It entails for example a boolean value which conditions the way in which the terminal will render the element.

When an event relating to the obsolescence of a message occurs, the value of the indicator is modified. The terminal can thus modify the way in which the message is rendered and guard the user of the terminal against the use of an out-of-date item of information or link contained in a message.

For example, when a new message is sent by a conversational agent, the validity indicator associated with certain interaction elements making it possible to trigger actions liable to become obsolete is initialized with a "true" value. Such a value indicates for example that all these fields are initially, but temporarily, relevant. Thus, the presence of a validity indicator associated with a value or an interaction element contained in a message indicates that the value or the associated action is liable to become obsolete. The service logic associated with the conversational agent determines whether a given field in a message must receive a validity indicator or whether it is an "inert" field, that is to say a field which will never become obsolete. For example, a delivery tracking action will receive a validity indicator set to "true" since this action is liable to be obsolete at a given moment. An action of the type "information on the service" can be considered to be an inert field, since this action always remains possible. Of course, the validity indicator can take various forms other than a boolean form. It may be for example a character string or an arbitrary numerical value.

The method thus improves the user experience by reducing the risk of confusion for the user and optimizes the use of the terminal's memory by making the obsolete data stored therein relevant.

Within the framework of this description, conversational agent is understood to mean an automaton adapted to respond automatically to messages sent by a user. Such a conversational agent is in particular adapted to interpret orders or key words included in messages that it receives. In particular, such a conversational agent can be configured to allow a user to carry out a transaction by exchanging messages on the basis of instant messaging. Such conversational agents are generally implemented by computer programs executed on servers having communication interfaces adapted to receive and send instant messages, such as SMSs, MMSs or other types of messages, such as for example messages compliant with the RCS standard.

According to another aspect, the invention relates to a method for checking validity of at least one message exchanged in an instant messaging conversation between a terminal and a conversational agent. The method is noteworthy in that the at least one message comprises at least one user interaction element intended to be rendered by the terminal and associated with a validity indicator, and in that it comprises the following steps:
  detection of an event relating to the obsolescence of at least one of the messages of the conversation,
  selection, according to a characteristic of the detected event, of at least one message of the conversation comprising an interaction element associated with a temporary validity indicator,
  transmission, to the terminal, of a message comprising at least one identifier of at least one interaction element associated with a temporary validity indicator.

A conversational agent implementing such a checking method can thus check the validity of information contained in messages that it transmits to a terminal. When a message, or a message part such as an interaction element included in a message becomes obsolete subsequent to the occurrence of a particular event, the server can inform the terminal that these messages contain obsolete data. The terminal can then react by modifying the messages in such a way that a user is not lulled into making an error by an out-of-date item of information.

According to a particular embodiment the updating method is such that the user interaction element is adapted to trigger a first action on the terminal, the rendering step comprising the replacement of the first action by a second action.

The method thus makes it possible to replace a first action designed to be triggered when a user of the terminal uses the interaction element by a second action, alternative to the first. Thus, during the rendering step, the terminal tests the value of the validity indicator to determine whether the element is obsolete and replaces the action initially associated with the interaction element by another action adapted to the obsolete character of the element. In this way, the behavior is no longer indeterminate when the user uses an interaction element included in a message that has become obsolete. For example, an action designed to trigger the opening of a Web page so as to track the delivery of a parcel can be replaced with an action causing the display of a message indicating the date on which the parcel was delivered.

According to a particular embodiment, the updating method is such that the user interaction element is adapted to trigger an action on the terminal, the rendering step comprising the deactivation of said action.

When the terminal renders a message comprising an interaction element whose associated action has become obsolete, the triggering of the action by the user is no longer possible. The terminal determines that the action associated with the element has become obsolete on the basis of the value of the validity indicator. The method thus makes it possible to guard a user of the terminal on which the method is implemented against actions on interaction elements contained in messages exchanged previously, whose result would be indeterminate. Moreover, the method thus safeguards the integrity of the message: its content not being modified, no relevant information is lost.

According to a particular embodiment of the updating method, the user interaction element is adapted to trigger a first action on the terminal, the rendering step comprising the addition of a visual indicator relating to the validity of the action.

The method thus makes it possible to indicate explicitly to the user that an item of information contained in the message, and in particular an action associated with an interaction element, is obsolete. In this way, the method makes it possible to prevent a user from attempting to use an interaction element. The advantage of such a provision is to avoid expenditure of energy that would be engendered by the terminal executing an action whose result would not be the one expected by the user. For example, the user will be prompted not to click on a parcel tracking link if it is explicitly indicated to him that the action will not succeed. The visual indication can take various forms, such as for example that of a message, a modification of the color of the interaction element or else the modification or the addition of a text associated with the interaction element or with the message. The addition of a visual indicator can be supplemented with the deactivation of an action associated with the element and/or with a replacement of this action by an alternative action.

According to a particular embodiment, the updating method is such that the detected event comprises at least one identifier adapted to identify at least one user interaction element included in at least one message of the conversation.

The method envisages associating an identifier with an interaction element. The event detected during the detection step also comprises one or more identifiers. Thus, only the messages whose identifier is indicated in the event are selected. It is thus possible to update just the messages concerned with the event.

According to a particular embodiment of the updating method, the method is such that the event is the exchanging of a new message.

In this way, the method makes it possible to update the structures of data included in the messages exchanged with a conversational agent when a new message is received or sent. For example, on receipt of such a message, the validity indicators included in the messages exchanged previously in the same conversation are modified so as to translate the obsolescence of data that they may contain.

For example, when a first message is received from a conversational agent and this message comprises a field liable to become obsolete, that is to say comprising a validity indicator translating an item of information whose longevity is not ensured, the reception of a second message from the same conversational agent causes the execution of the steps of the method. For example, when a conversational agent sends a first message comprising a link for tracking the conveying of a parcel, the reception by the terminal of a subsequent message originating from this conversational agent causes the execution of the steps of the method and an updating of the first message.

As a variant, the event is triggered only when the message which is at the origin thereof comprises a particular characteristic. In this way, a conversational agent can trigger an update when its service logic determines that messages sent or received previously by the terminal have become obsolete.

In a particular embodiment of the updating method, the message exchanged comprises a field denoting the obsolescence of at least one message exchanged in the conversation.

The terminal can thus directly identify the messages that have become obsolete. Such a field comprises for example a message identifier and/or an identifier of an element included in one or more messages. In this way, the modification of the messages can be selective.

According to a particular embodiment of the updating method, the event is the expiry of a time lag.

The method thus allows an updating of the messages at regular intervals or at a predetermined moment. For example, when a message comprises an interaction element associated with a date, the value of the validity indicator is modified when the date included in this message has passed.

According to another aspect, the invention relates to a device for updating at least one message exchanged in an instant messaging conversation between the device and a conversational agent, the at least one message comprising at least one validity indicator and a user interaction element intended to be rendered by the device, the device being characterized in that it comprises a processor and a memory containing instructions adapted to be executed by the processor, the processor being configured by the instructions so as to:
    detect an event relating to the obsolescence of at least one of the messages of the conversation,
    select, according to a characteristic of the detected event, at least one message of the conversation,
    modify the validity indicator in the selected messages, and
    render modified messages according to a value of the validity indicator.

According to yet another aspect, the invention also relates to a device for checking validity of at least one message exchanged in an instant messaging conversation between the device and a terminal, the device being characterized in that the at least one message comprises at least one user interaction element intended to be rendered by the terminal and associated with a validity indicator, and in that it comprises a processor and a memory containing instructions adapted to be executed by the processor, the processor being configured by the instructions so as to implement modules for:
    detection of an event relating to the obsolescence of at least one of the messages of the conversation,
    selection, according to a characteristic of the detected event, of at least one message of the conversation comprising an interaction element associated with a temporary validity indicator, and for
    transmission, to the terminal, of a message comprising at least one identifier of at least one interaction element associated with a temporary validity indicator.

According to a particular embodiment, the invention relates to a terminal comprising an updating device and/or a checking device such as are described hereinabove.

In a particular embodiment, the various steps of the method are determined by computer program instructions.

Consequently, the invention is also aimed at a computer program comprising instructions for the execution of the steps of the updating method and/or instructions for the execution of the steps of the checking method, when said program is executed by a processor.

Such a program can use any programming language, and be in the form of source code, object code, or of code intermediate between source code and object code, such as in a partially compiled form, or in any other desirable form.

Finally, the invention relates to an information medium readable by a processor on which is recorded a computer program comprising instructions for the execution of the steps of the updating method and/or instructions for the execution of the steps of the checking method.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can in particular be downloaded over a network of Internet type. Alternatively, the information medium can be an integrated circuit in which the program is incorporated, the circuit being adapted to execute or to be used in the execution of the method in question.

The various aforementioned embodiments or characteristics can be added independently or in combination with one another, to the steps of the updating method such as is defined hereinabove.

The terminals, devices and programs exhibit at least advantages analogous to those conferred by the corresponding updating method.

LIST OF FIGURES

Figure 1B:
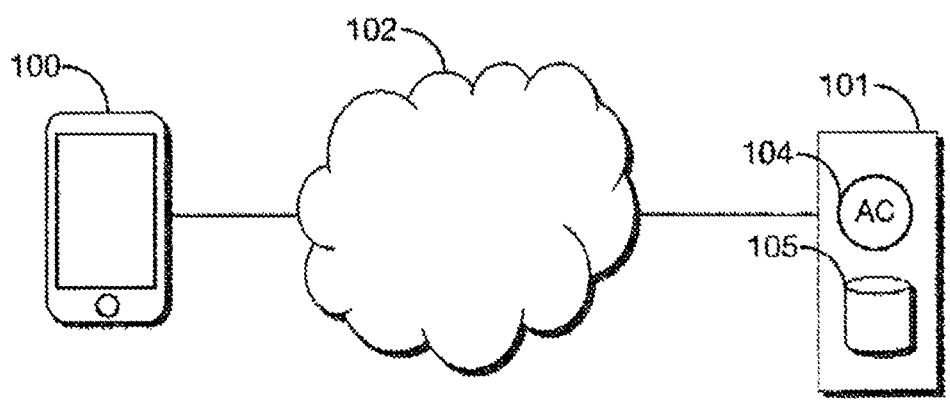
Figure 2:
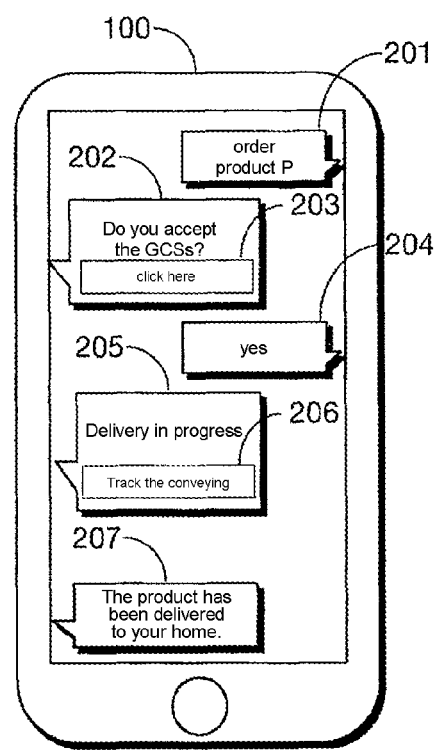
Figure 4:
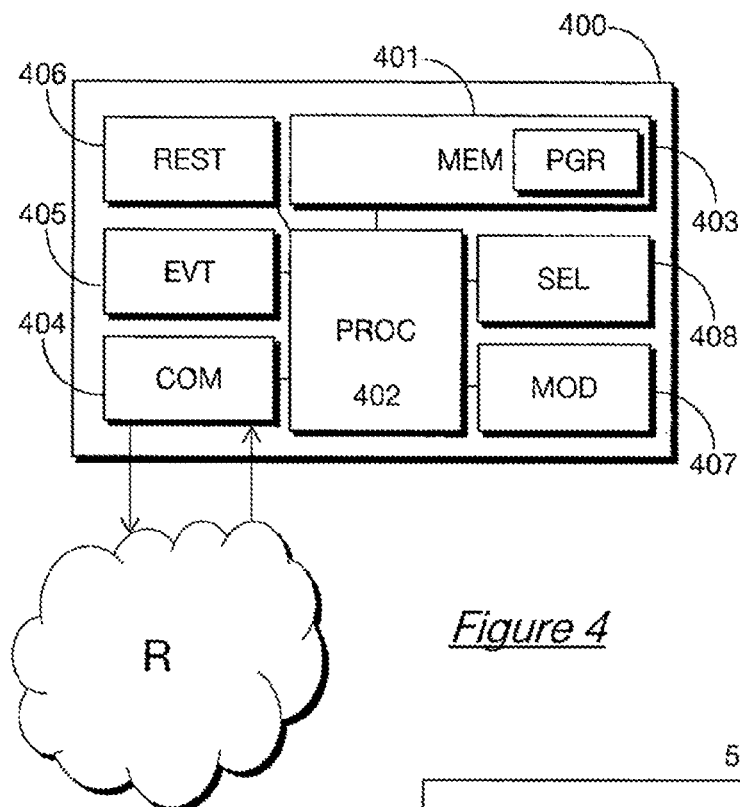

Other characteristics and advantages of the method will become more clearly apparent on reading the following description of a particular embodiment, given by way of simple illustrative and nonlimiting example, and of the appended drawings, among which:

FIG. 1a illustrates a network architecture adapted for the implementation of the updating method according to a particular embodiment of the invention, FIG. 1b illustrates a network architecture adapted for the implementation of the updating method according to a particular embodiment of the invention, FIG. 2 illustrates a terminal on the screen of which are displayed messages in the form of a conventional conversational view, FIG. 3a illustrates the main steps of the updating method according to a particular embodiment of the invention, FIG. 3b illustrates the main steps of the checking method according to a particular embodiment of the invention, FIG. 4 represents in a simplified manner the architecture of a device adapted to implement the updating method according to a particular embodiment.

Figure 5:
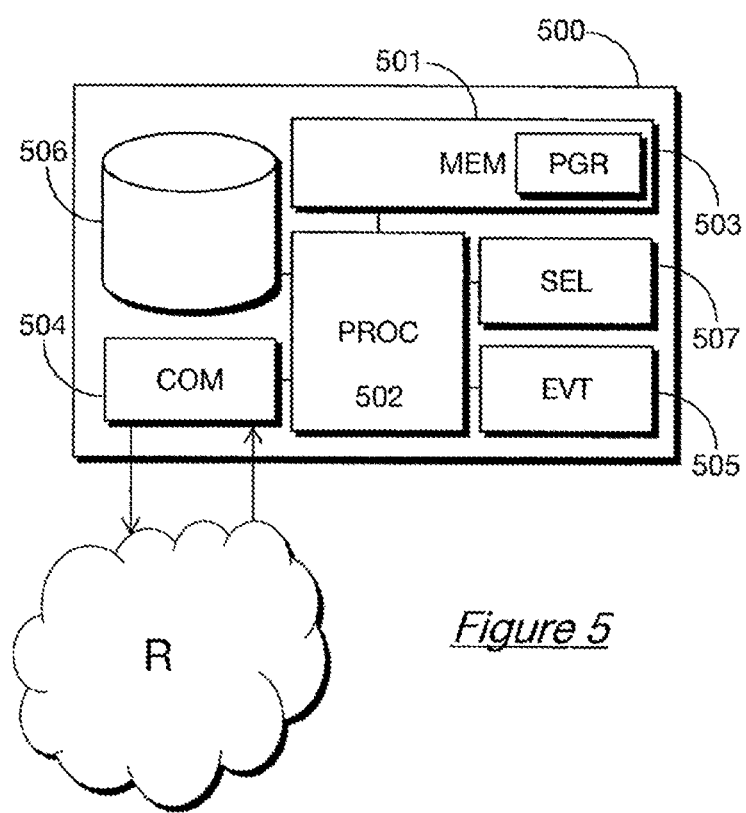

FIG. 5 represents in a simplified manner the architecture of a device adapted to implement the checking method according to a particular embodiment.

DETAILED DESCRIPTION OF A FIRST EMBODIMENT

FIG. 1 illustrates an architecture adapted to implement the updating method according to a particular embodiment of the invention. Such an architecture comprises a communication terminal 100 configured to communicate through a communication network 102 with a server 101.

The server 101 comprises a conversational agent 103 adapted to automatically respond to messages sent by terminals, and in particular to respond to the messages sent by the terminal 100. Thus, the terminal 100 can interact with the conversational agent. These interactions can correspond to a transaction, a negotiation, a booking or any other exchange allowing the terminal 100 or its user to obtain a service. The conversational agent is programmed to respond to the messages according to a service logic determined by a state automaton. The automaton implemented in the conversational agent 103 is in particular adapted to allow a terminal to place an order via instant messaging so as to purchase a product and have it delivered. Of course, the method can be applied to all sorts of services offered by a conversational agent, such as making bookings for the account of the terminal 100 with a cinema, a restaurant, a transport means, a vehicle renter, etc. According to other examples, such a conversational agent can be adapted to order goods or services, obtain a particular item of information such as meteorological forecasts or else be integrated into a connected gadget such as an automatic dispenser, parking payment meter, etc.

The network 102 is a communication network allowing the terminal 100 to communicate with other gadgets, and in particular with the server 101 on which the conversational agent 103 is implemented. The communication network can be a cellular network such as a GSM, 3G or else 4G network, or else still an Internet network which the terminal can access by way for example of a Wifi or cellular connection.

The terminal 100 is here a mobile telephone of "smartphone" type having communication means adapted to connect to one or more communication networks, such as Wifi networks or cellular networks, as well as a memory and a processor which are adapted to execute computer program instructions. The method described hereinafter can however be implemented on other terminal types, such as on a tablet, a connected object, a vehicle dashboard or else a personal computer, for example in messaging software. The terminal 100 is furthermore adapted to communicate according to at least one instant messaging protocol with other terminals or devices. For example, the terminal 100 can send and receive messages of SMS (Short Message Service) type by way of a cellular network, or else implement the RCS (Rich Communication Suite) standard, the SIP SIMPLE or Jabber protocol or any other protocol adapted to send and receive messages. In particular, the terminal 100 can exchange instant messages with the server 101 through the network 102.

FIG. 2 illustrates an exchange of messages in the course of which the terminal 100 places an order for a product P with the conversational agent 103. This example illustrates a simple interaction with a conversational agent. It is understood that other more complex interactions, implementing more or less numerous exchanges of messages, can be envisaged.

A first message 201, sent by the terminal 100 to the server 101, is seen. This message conventionally comprises an identifier of the addressee and a text message in which the user of the terminal 100 asks to make a booking with a service. On receipt of the message 201, the conversational agent interprets the text field and initializes a state automaton adapted to process the order according to a service logic specific to the conversational agent.

In response to this first message, the conversational agent sends a new message 202 asking the user of the terminal to accept the general conditions of sale. The message 202 comprises a textual wording and an interaction element 203 allowing the user to consult the general conditions of sale. Accordingly, with the interaction element 203 is associated an action which, when it is triggered by the user, makes it possible to open in an Internet browser a corresponding particular Web page on which the general conditions of sale of the ordering service are published.

The user accepts the general conditions of sale by sending a message 204 in response to the message 202.

The message 205 returned by the conversational agent comprises a textual indication according to which the order is out for delivery, and an interaction element offering the user of the terminal the possibility of obtaining details regarding the conveying of the ordered product. Accordingly, the interaction element is associated with an action which, when it is triggered by the user, causes the opening of a Web page on the Web site of a merchandise transporter making it possible to obtain details on the conveying of the ordered parcel.

Finally, when the product has actually been received by its addressee, a message 207 is received from the conversational agent so as to complete the order.

A particular embodiment of the updating method will now be presented with reference to FIGS. 2 and 3.

By conversation is meant a set of messages exchanged between at least two opposite parties on a given topic. The subject of the conversation may be a financial transaction, a booking or else an order. The messages exchanged between the terminal 100 and the conversational agent 103 to place an order constitute for example a conversation within the meaning of the present disclosure.

According to a particular embodiment of the invention, to distinguish messages belonging to various conversations taking place between the same opposite parties, the messages can comprise a grouping identifier. Thus, the messages 201, 202, 204, 205 and 207 share one and the same grouping identifier and belong to the same conversation.

This identifier may for example be constructed on the basis of the call identifier of the terminal 100 and of that of the conversational agent, to which is for example added the time of sending of the first message. According to a particular embodiment it may entail a unique identifier obtained from a dedicated server or calculated by the terminal by a pseudo-random generator known to the person skilled in the art.

Such a grouping identifier thus makes it possible to identify in a non-equivocal manner a particular transaction between the terminal 100 and the conversational agent 103. It is then possible, both for the conversational agent and for the terminal 100, to interpret in a coherent manner several simultaneous conversations, even when messages relating to a first and a second conversation are intercalated.

Thus, a new conversation is initiated by the sending of the message 201 to the conversational agent 103.

Among the messages exchanged in the course of the conversation illustrated in FIG. 2, it may be noted that the message 202 comprises a user interaction element 203. When it receives such a message, the terminal 100 interprets the content thereof and renders the item of information that it contains in an appropriate manner. In this instance, the message 202 contains data structured according to a particular syntax describing at one and the same time a content and the way in which this content must be rendered by the terminal, such as for example an XML (Extensible Markup Language) syntax or HTML (HyperText Markup Language) syntax or any other appropriate interface description language.

For example, the message 202 can take the following form:

```
<message id="202" idr="999" from="103" to "100" >
    <label> Do you accept the GCSs?</label>
    <interaction>
        <button type="button"
target="http://www.xyz.com/gcs"> click here </button>
    </interaction>
</message>
```

The message 205 also comprises an interaction element 206.

However, the message 205 is distinguished from a message according to the prior art such as the message 202 in that it furthermore comprises a validity indicator associated with the interaction element 203. Such a field takes for example the form of a boolean value and denotes the permanent or temporary character of the validity of the action associated with the interaction element. For example, the sender of the message assigns a "true" value to the validity indicator to denote the fact that the associated action possesses a temporary validity. In this instance, whilst the interaction element 203 makes it possible to trigger the opening of a Web page on which the general conditions of sale are set out, and which are by nature intangible during the transaction, the interaction element 206 makes it possible to access a Web page for tracking the conveying of the parcel. Such an action associated with the interaction element 206 possesses a temporary validity since it becomes obsolete when the parcel is actually delivered.

The message 205 may for example take the following form:

```
<message id="205" idr="999" from="103" to "100" >
    <label> Delivery in progress </label>
    <interaction>
        <valid>TRUE</valid>
        <button type="button"
target="http://www.xyz.com/follow"> Track the conveying
</button>
    </interaction>
</message>
```

Here, the validity indicator lies between the <valid> tags and possesses the value "true" so as to indicate that the action associated with the interaction (here delineated by the "target" attribute of the "button" tag) has a temporary validity. The validity indicator may equally well be transmitted in the form of an attribute of the "button" tag or in any other appropriate form.

The examples of messages described hereinabove furthermore comprise a message identifier and a grouping identifier, indicated respectively by the attributes "id" and "idr" of the message tag. On the basis of these identifiers, a terminal can identify a particular message and/or a particular conversation.

During a first step 300, an event relating to the obsolescence of at least one of the messages of an instant messaging conversation with a conversational agent is detected. The conversation corresponds here to the messages 201, 202, 204, 205 and 207 described hereinabove with reference to FIG. 2. These messages, belonging to the conversation, are identified by the attribute "idr" which here possesses the value 999. Alternatively, the grouping identifier can be included in the header of the message, in its subject or in any other appropriate part of the message.

Here, the detected event corresponds to the reception of the message 207 by the terminal, but it can also correspond to the sending of a message by the terminal 100. The reception of the message 207 by the terminal 100 is indeed an event relating to the obsolescence of a message of the conversation identified by the grouping identifier 999 since it indicates that the product ordered has been delivered. Consequently, the reception of the message 207 implies the obsolescence of the interaction included in the message 205 informing the user that delivery is in progress.

According to a particular embodiment, the message 207 comprises a field which is set according to the service logic of the conversational agent 103 indicating explicitly or otherwise that certain previously received messages have become obsolete. For example, the message can comprise one or more identifiers of messages sent previously by the conversational agent and which have become obsolete. In this way, the conversational agent can designate precisely the messages which must be updated since they contain information that has become obsolete. Accordingly, the conversational agent stores a context, for example in a database, in which it associates a message identifier and a temporary validity character according to its own service logic. In this instance, the conversational agent stores in a database that the interaction element 206 of the message 205 of the conversation 999 will become obsolete when the parcel is delivered. When the conversational agent is informed of the actual delivery of the parcel, it sends a message 207 addressed to the terminal 100 comprising the conversation identifier 999 and an indication according to which the interaction element 206 is obsolete. In such an embodiment, the validity indicator of the message 205 is not transmitted to the terminal, since the message 207 suffices to identify the elements that have become obsolete.

According to another example, the message 207 can comprise a characteristic according to which this message is the last message of the conversation, that is to say according to which it is the last of the messages associated with one and the same grouping identifier. Such a characteristic can be used by the terminal to determine that the messages received beforehand and comprising a temporary validity indicator have become obsolete. For example, the message 207 can comprise an item of information on the progress of the ordering process, said item of information indicating that the message corresponds for example to the third step of an ordering process comprising 3 steps. Any other indication allowing the terminal 100 to deduce that the message is the last message of the interaction can also be used, such as for example a boolean value which indicates that the message is the last message of the conversation when it is true.

According to a particular embodiment, the detected event is the expiry of a time lag. For example, when a terminal receives a message comprising a booking confirmation for a given date and an interaction element making it possible to cancel this booking, the cancellation action becomes obsolete if the date of the booking has passed. Accordingly, when the terminal 100 receives a message comprising a date and an interaction element associated with a temporary validity indicator, an alert is configured to trigger an event when the date has passed. The terminal can then detect such an event in step 300 when it occurs.

Again according to a particular embodiment, the detected event is a user action on a button or a link provided for this purpose. The user can be prompted with such a button on an interface of the terminal to "wipe" the history of the messages.

When an event is detected in step 300, the terminal selects in step 301 the messages of the conversation whose validity indicator denotes a temporary validity of the associated interaction element. Accordingly, the terminal obtains the list of the messages belonging to the conversation identified in the event detected in step 300, by performing for example a search in a database for storing the messages. The terminal thereafter analyzes the messages obtained and selects the messages comprising a validity indicator denoting an element that has become obsolete. In this instance, the terminal selects the message 205 since it belongs to the conversation whose grouping identifier is identical to that of the message 207 and because it comprises a validity indicator whose value is set to "true" to indicate that the action associated with the interaction element 206 has a temporary validity. Of course, when several messages of the conversation comprise one or more validity indicators whose value denotes the temporary validity of an interaction element, all of the messages meeting these criteria are selected.

During step 302, the messages selected are modified. In particular, the modification comprises the modification of the value of the validity indicator in the selected messages. The temporary validity indicator associated with the element 206 of the message 205 is thus set to "false" to indicate that the associated action is henceforth obsolete. Accordingly, the terminal implements an XML, HTML analyzer or any other analyzer adapted to analyze the content of the messages so as to locate and modify the temporary validity indicator. In this instance, the analyzer is implemented to modify the value of the <valid> tag so as to assign it the value "true".

Finally, in step 303, the terminal renders the modified messages according to the value of the validity indicator. During this rendering step, the terminal deactivates the interaction elements whose temporary validity indicator is set to "false". Deactivation can be achieved by inserting for example the "disabled" attribute of the "button" element into the content of the message, when dealing with a message in the HTML format. This modification is for example carried out by implementing an analyzer adapted to the format of the message to be modified, detecting one or more validity indicators whose value is set to "false", and modifying an attribute of the interaction element associated with this indicator. As a variant, the modification can consist in deleting the action associated with the interaction element, in masking the interaction element, in modifying its color, in replacing the action by an alternative action, such as for example by an action aimed at displaying a message informing the user that the action is no longer available, or else in adding an explanatory text associated with the interaction element.

DESCRIPTION OF A SECOND EMBODIMENT

According to a particular embodiment, the terminal 100 exchanges instant messages with a conversational agent 104 within the framework of a conversation. The messages exchanged were described with reference to FIG. 2. The conversational agent 104 implements a method for checking validity of the content of a message of the conversation.

During a first step 310, the conversational agent sends the terminal 100 a message comprising at least one interaction element associated with a validity datum. Accordingly, it stores in a database 105 a temporary validity indicator in association with an element of a sent message, such as for example an interaction element such as described hereinabove or any other part or content of the message, as well as a message identifier and/or identifier of the element of the message. For example, when sending the message 205 to the terminal 100, the conversational agent 103 stores in the database 105 of the server 101, the fact that the interaction element 206 of the message 205 possesses a temporary validity. The fact that such an element possesses a temporary validity is determined by the service logic of the conversational agent, this service logic being for example implemented by a predetermined state automaton. The message 205 sent to the terminal 100, and/or the interaction element 206, is then associated with a temporary validity indicator in the database 105.

During a step 311, the conversational agent 104 detects an event relating to the obsolescence of at least one of the messages sent previously addressed to the terminal 100. Such an event is for example a change of state of the automaton defining the service logic of the conversational agent. For example, the obtaining of an item of information according to which an order has been dispatched or delivered by a transporter causes a change of state of the automaton of the conversational agent. Such a change of state is an exemplary event relating to the obsolescence of a message or of a message part if it makes an item of information contained in the message obsolete. Other events liable to make information contained in sent messages obsolete can be detected by the conversational agent, such as for example the expiry of a time lag, the receipt of a particular message, originating from the terminal 100, the receipt of a proof of payment originating from a financial organism. To implement the detection of such events, a suitably adapted programming interface (API for Application Programming Interface) can be put in place on the server 101.

In step 312, the conversational agent 104 searches the database 105 and selects therefrom the messages or elements of messages that have become obsolete subsequent to the event detected in step 311. The messages or elements of messages whose validity is affected by the event are determined by a service logic specific to the conversational agent. The conversational agent 104 may for example comprise a rule according to which the detection of an event corresponding to the delivery of a parcel makes the message 205 relating to the conveying of the parcel obsolete. Various rules can be implemented according to the events detected and the type of the messages sent. For example, in the case of an automaton taking bookings for a restaurant, a message allowing the user to cancel a booking can be made obsolete when the date of the booking has passed.

In step 313, when at least one message is selected in step 312, that is to say when at least one of the previously sent messages has become obsolete, the conversational agent transmits the list of the selected messages to the terminal 100. Accordingly, the conversational agent generates a new message comprising one or more fields denoting the obsolescence of the at least one message of the conversation which were selected in step 312. Accordingly, the conversational agent 104 inserts into the message generated, using an appropriate field, identifiers of messages and/or of elements of the selected messages. The validity indicators associated with these messages and which have been stored in the database 105 can then be deleted from the database 105. For example, the conversational agent 104 inserts an identifier of the message 205 and/or of the interaction element 206 into the message 207.

The terminal 100 implements the updating method according to a particular embodiment.

During step 300, the terminal 100 detects that the message 207 comprises at least one identifier of a previously exchanged message that has become obsolete.

In step 301 the terminal selects, from among the messages exchanged with the conversational agent 104, the messages whose identifiers are included in the message 207 and/or the messages comprising elements whose identifiers are included in the message 207. The selection is performed by the terminal according to a characteristic of the message 207, that is to say according to one or more identifiers of messages or of elements of messages included in the message 207 and associated by the conversational agent 104 with a temporary validity indicator. For example, the message 207 comprises the identifier of the message 205 and/or the identifier of the interaction element 206.

The terminal modifies the messages selected during a step 302. The modification comprises for example the deletion of an action associated with an interaction element that has become obsolete, or else the masking of this interaction element. The modification can also consist in a modification of its color, in replacing the action by an alternative action, such as for example by an action aimed at displaying a message informing the user that the action is no longer available, or else in the addition of an explanatory text associated with the interaction element. For example, the terminal deactivates the action associated with the element 206 of the message 205 in such a way that an action of the user on the button 206 does not trigger an indeterminate action.

Subsequent to the modification of the message, the terminal renders the modified message on the screen of the terminal in step 303.

FIG. 4 illustrates, according to a particular embodiment of the invention, a device 400 adapted to implement the updating method.

The device comprises a storage space 401, for example a memory MEM, a processing unit 402 equipped for example with a processor PROC. The processing unit can be driven by a program 403, for example a computer program PGR, implementing the updating method such as described in the present document, with reference to FIG. 3*a*, and in particular the steps of detecting an event relating to the obsolescence of at least one of the messages of the conversation, of selecting according to a characteristic of the detected event, at least one message of the conversation whose validity indicator denotes a temporary validity of the associated interaction element, of modifying the validity indicator in the selected messages, and of rendering the modified messages according to a value of the validity indicator.

On initialization, the instructions of the computer program 403 are for example loaded into a RAM (Random Access Memory) memory before being executed by the processor of the processing unit 402. The processor of the processing unit 402 implements the steps of the updating method according to the instructions of the computer program 403.

Accordingly, the memory 401 is furthermore adapted to store at least one message exchanged with a conversational agent, the message comprising at least one validity indicator associated with one or more elements contained in the message.

The device 400 also comprises communication means 404, such as for example a network interface COM (for example a WiFi, 3G, 4G or Ethernet interface), allowing the device to connect to a telecommunication network R and to exchange data with other devices by way of the telecommunications network, and in particular to exchange messages with a conversational agent.

The device 400 also comprises a detection module 405 adapted to detect an event relating to the obsolescence of at least one of the messages of a conversation. Such a module can be implemented by computer program instructions which are stored in the memory 401 and which are adapted to be executed by the processor of the processing unit 402.

The device furthermore comprises a selection module 408 adapted to select at least one message of the conversation according to a characteristic of the event detected by the detection module 405. Accordingly, the module 405 can be implemented by computer program instructions which are adapted to be executed by the processor of the processing unit 402 and which are configured to obtain the list of the messages belonging to the conversation identified in the event detected in step 300, by performing for example a search in a database for storing the messages by virtue of an appropriate SQL (Simple Query Language) query.

The device also comprises a modification module 407 adapted to modify the validity indicator in the messages selected by the selection module 408. Accordingly, the module 407 can be implemented by computer program instructions which are adapted to be executed by the processor of the processing unit 402 and which are configured to on the one hand identify in a message, by virtue of a suitably adapted analyzer (such as for example an HTML or XML analyzer), at least one validity indicator of an element of the message, and on the other hand modify the value of the validity indicator, the new value being associated with the fact that the element is obsolete.

The device finally comprises a rendering module 406 adapted to render modified messages according to a value of the validity indicator. Accordingly, the module 406 can be implemented by computer program instructions which are adapted to be executed by the processor of the processing unit 402 and which are configured to deactivate the interaction elements whose temporary validity indicator is set to a particular value. For example, the computer program is configured to insert a "disabled" attribute into the interface description of the "button" element of a message in the HTML format when this element is associated with a validity indicator denoting a temporarily valid element. This modification is for example carried out by implementing an analyzer adapted to the format of the message to be modified, detecting one or more validity indicators whose value is set to "true", and modifying an attribute of the interaction element associated with this indicator. As a variant, the modification can consist in the deletion of the action associated with the interaction element, in masking the interaction element, in modifying its color, in replacing the action by an alternative action, such as for example by an action aimed at displaying a message informing the user that the action is no longer available, or else in the addition of an explanatory text associated with the interaction element.

FIG. 5 illustrates, according to a particular embodiment of the invention, a device 500 adapted to implement the checking method.

The device comprises a storage space 501, for example a memory MEM, a processing unit 502 equipped for example with a processor PROC. The processing unit can be driven by a program 503, for example a computer program PGR, implementing the checking method such as described in the present document, with reference to FIG. 3b, and in particular the steps of detecting an event relating to the obsolescence of at least one of the messages of the conversation, of selecting, according to a characteristic of the detected event, at least one message of the conversation comprising an interaction element associated with a temporary validity indicator, and of transmitting, to the terminal, a message comprising at least one identifier of at least one interaction element associated with a temporary validity indicator.

On initialization, the instructions of the computer program 503 are for example loaded into a RAM memory before being executed by the processor of the processing unit 502. The processor of the processing unit 502 implements the steps of the checking method according to the instructions of the computer program 503.

The device 500 also comprises communication means 504, such as for example a network interface COM, allowing the device to connect to a telecommunication network R and to exchange data with other devices by way of the telecommunications network, and in particular to exchange messages with a communication terminal. The interface COM can be for example a WiFi, 3G, 4G network interface or else an Ethernet interface and allows the device to transmit messages comprising at least one interaction element and messages comprising at least one identifier of at least one interaction element associated with a temporary validity indicator.

The device 500 comprises a detection module 505 adapted to detect an event relating to the obsolescence of at least one of the messages of a conversation. Such a module can be implemented by computer program instructions which are stored in the memory 501 and which are adapted to be executed by the processor of the processing unit 502.

The device furthermore comprises a selection module 507 adapted to select at least one message of a conversation according to a characteristic of the event detected by the detection module 505. Accordingly, the module 507 can be implemented by computer program instructions which are adapted to be executed by the processor of the processing unit 402 and which are configured to obtain the list of the messages belonging to the conversation identified in the event detected in step 311, by performing for example a search, by virtue of an appropriate SQL (Simple Query Language) query, in a database for storing the messages in association with validity indicators.

The device also comprises a database 506 adapted to store indicators of temporary validity in association with messages and/or elements of messages, such as interaction elements included in messages.

The invention claimed is:

1. A method comprising the following acts performed by a terminal:
updating at least one message in a history of an instant messaging conversation between the terminal and a conversational agent, wherein the at least one message in the history of the instant messaging conversation comprises a user interaction element to be rendered by the terminal, the user interaction element being associated with a validity indicator according to a service logic of the conversational agent, and wherein the updating comprises:
detecting an event relating to obsolescence of at least one of the messages of the conversation,
selecting, according to a characteristic of the detected event, the at least one message of the conversation comprising the user interaction element associated with the validity indicator,
modifying a value of the validity indicator in the at least one selected message by a value indicating the obsolescence of the associated user interaction element, and
modifying the at least one selected message comprising the user interaction element according to the value of the associated validity indicator.

2. The method as claimed in claim 1, in which the user interaction element is adapted to trigger a first action on the terminal, the modifying of the message comprising replacement of the first action by a second action.

3. The method as claimed in claim 1, in which the user interaction element is adapted to trigger a first action on the terminal, the modifying of the message comprising deactivation of the action.

4. The method as claimed in claim 1, in which the user interaction element is adapted to trigger a first action on the terminal, the modifying of the message comprising addition of a visual indicator relating to the validity of the action.

5. The method as claimed in claim 1, in which the detected event comprises at least one identifier adapted to identify at least one user interaction element included in at least one message of the conversation.

6. The method as claimed in claim 1, in which the detected event is an exchanging of a new message.

7. The method as claimed in claim 6, in which the new message exchanged comprises a field denoting obsolescence of at least one message exchanged in the conversation.

8. The method as claimed in claim 1, in which the detected event is an expiry of a time lag.

9. A device for updating at least one message in a history of an instant messaging conversation between the device and a conversational agent, the at least one message in the history of the instant messaging conversation comprising at least a user interaction element to be rendered by the device, the user interaction element being associated with a validity indicator according to a service logic of the conversational agent, the device comprising:
- a processor and a memory containing instructions adapted to be executed by the processor, the processor being configured by the instructions so as to:
- detect an event relating to the obsolescence of at least one of the messages of the conversation,
- select, according to a characteristic of the detected event, the at least one message of the conversation comprising the interaction element associated with the validity indicator,
- modify a value of the validity indicator in the at least one selected message by a value indicating the obsolescence of the associated user interaction element, and
- modify the at least one selected message comprising the user interaction element according to the value of the associated validity indicator.

10. The device as claimed in claim 9, wherein the device is implemented in a terminal.

11. A method comprising the following acts performed by a conversational agent of a device, the conversational agent being adapted to respond to messages according to a service logic specific to this conversational agent:
- checking validity of at least one message in a history of an instant messaging conversation between a terminal and the conversational agent, wherein the at least one message of the conversation comprises at least one user interaction element to be rendered by the terminal and associated with a validity indicator according to the service logic of the conversational agent, and wherein the checking comprises:
- detecting an event relating to obsolescence of at least one of the messages of the conversation,
- selecting, according to a characteristic of the detected event, the at least one message of the conversation comprising the user interaction element associated with the validity indicator in which the user interaction element is obsolete, and
- transmitting, to the terminal, at least one identifier of the at least one selected message so that the terminal can modify a value of the validity indicator by a value indicating the obsolescence of the associated user interaction element and modify the user interaction element of the at least one selected message according to the modified value of the validity indicator.

12. A device for checking validity of at least one message in a history of an instant messaging conversation between the device and a terminal, wherein the at least one message of the conversation comprises at least one user interaction element to be rendered by the terminal and associated with a validity indicator according to a service logic of a conversational agent of the device, and wherein the device comprises:
- a processor and a memory containing instructions adapted to be executed by the processor, the processor being configured by the instructions so as to:
- detect an event relating to obsolescence of at least one of the messages of the conversation,
- select, according to a characteristic of the detected event, the at least one message of the conversation comprising the user interaction element associated with the validity indicator in which the user interaction element is obsolete, and
- transmit, to the terminal, a message comprising at least one identifier of the at least one selected message so that the terminal can modify a value of the validity indicator by a value indicating the obsolescence of the associated user interaction element and modify the user interaction element of the at least one selected message according to the modified value of the validity indicator.

13. The device as claimed in claim 12, wherein the device is implemented in a server.

14. A non-transitory computer readable information medium on which is recorded a computer program comprising instructions for execution of a method of updating at least one message in a history of an instant messaging conversation between a terminal and a conversational agent, when the instructions are executed by a processor of a device, wherein the at least one message in the history of the instant messaging conversation comprises a user interaction element to be rendered by the terminal, the user interaction element being associated with a validity indicator according to a service logic of the conversational agent, and wherein the instructions configure the device to:
- detect an event relating to obsolescence of at least one of the messages of the conversation,
- select, according to a characteristic of the detected event, the at least one message of the conversation comprising the user interaction element associated with the validity indicator,
- modify a value of the validity indicator in the at least one selected message by a value indicating the obsolescence of the associated user interaction element, and
- modify the at least one selected message comprising the user interaction element according to the value of the associated validity indicator.

* * * * *